United States Patent
Kim

(10) Patent No.: US 12,319,288 B2
(45) Date of Patent: Jun. 3, 2025

(54) AUTONOMOUS DRIVING APPARATUS FOR GENERATING A DRIVING PATH FOR AN INTERSECTION BASED ON A DRIVING RECORD, AND AN AUTONOMOUS DRIVING METHOD THEREOF

(71) Applicants: HYUNDAI MOTOR COMPANY, Seoul (KR); KIA CORPORATION, Seoul (KR)

(72) Inventor: Hee Gwon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 622 days.

(21) Appl. No.: 17/592,306

(22) Filed: Feb. 3, 2022

(65) Prior Publication Data

US 2023/0009223 A1    Jan. 12, 2023

(30) Foreign Application Priority Data

Jul. 9, 2021 (KR) .................. 10-2021-0090476

(51) Int. Cl.
*B60W 30/18* (2012.01)
*B60W 60/00* (2020.01)

(52) U.S. Cl.
CPC .... *B60W 30/18145* (2013.01); *B60W 60/001* (2020.02); *B60W 2520/06* (2013.01);
(Continued)

(58) Field of Classification Search
CPC ......... B60W 30/18145; B60W 60/001; B60W 2520/06; B60W 2520/10;
(Continued)

(56) References Cited

U.S. PATENT DOCUMENTS 11,782,451 B1 * 10/2023 Venkatraman ....... G05D 1/0221
2019/0071068 A1 * 3/2019 Shin ...................... B60W 20/12
(Continued)

FOREIGN PATENT DOCUMENTS

CN          114184201 A   *   9/2020   ............. G01C 21/30

OTHER PUBLICATIONS

CN114184201(A) with figures (Year: 2020).*

*Primary Examiner* — Russell Frejd
*Assistant Examiner* — Brittany Renee Peko
(74) *Attorney, Agent, or Firm* — Lempia Summerfield Katz LLC

(57) ABSTRACT

An autonomous driving apparatus for generating an intersection path reflecting a driving record may include: a path generating device that generates information on a first path for driving of an autonomous vehicle at an intersection; a path comparison operating device that generates offset information between the generated information on the first path and information on a second path along which the autonomous vehicle is driving; a comparison operation evaluating device that determines whether to store the information on the second path based on the generated offset information; and a comparison operation storage that stores the information on the second path and the offset information based on the determination of whether to store the information on the second path.

20 Claims, 6 Drawing Sheets

(52) U.S. Cl.
CPC ... *B60W 2520/10* (2013.01); *B60W 2520/105* (2013.01); *B60W 2520/125* (2013.01); *B60W 2540/18* (2013.01); *B60W 2552/30* (2020.02); *B60W 2554/801* (2020.02); *B60W 2554/802* (2020.02); *B60W 2556/50* (2020.02)

(58) Field of Classification Search
CPC ..... B60W 2520/105; B60W 2520/125; B60W 2540/18; B60W 2552/30; B60W 2554/801; B60W 2554/802; B60W 2556/50; B60W 30/18154; B60W 60/0015; B60W 30/18159; B60W 40/072; B60W 40/105; B60W 40/107
See application file for complete search history.

(56) References Cited

U.S. PATENT DOCUMENTS

| | | | | |
|---|---|---|---|---|
| 2021/0046923 | A1* | 2/2021 | Olson | B60W 30/09 |
| 2021/0094574 | A1* | 4/2021 | Lee | B60W 60/0015 |
| 2021/0383209 | A1* | 12/2021 | Brahma | G06N 3/08 |
| 2022/0082403 | A1* | 3/2022 | Shapira | G01C 21/3658 |

* cited by examiner

| MAP INFORMATION | GLOBAL PATH POINT | | P1 | P2 | P3 | P4 | P5 | P6 | ... |
|---|---|---|---|---|---|---|---|---|---|
| INFORMATION ON FIRST PATH | FIRST POINT(S) | | p1 | p2 | p3 | p4 | p5 | p6 | ... |
| | ATTRIBUTE INFORMATION | HEADING ANGLE | h1 | h2 | h3 | h4 | h5 | h6 | ... |
| | | STEERING ANGLE | s1 | s2 | s3 | s4 | s5 | s6 | ... |
| | | LATERAL ACCELERATION | ay1 | ay2 | ay3 | ay4 | ay5 | ay6 | ... |
| | | CURVATURE | r1 | r2 | r3 | r4 | r5 | r6 | ... |
| INFORMATION ON SECOND PATH | DISTANCE OFFSET INFORMATION ACCORDING TO FIRST AND SECOND POINT(S) | | m1 | m2 | m3 | m4 | m5 | m6 | ... |
| | ATTRIBUTE OFFSET INFORMATION | HEADING ANGLE | h_m1 | h_m2 | h_m3 | h_m4 | h_m5 | h_m6 | ... |
| | | STEERING ANGLE | s_m1 | s_m2 | s_m3 | s_m4 | s_m5 | s_m6 | ... |
| | | LATERAL ACCELERATION | ay_m1 | ay_m2 | ay_m3 | ay_m4 | ay_m5 | ay_m6 | ... |
| | | CURVATURE | r_m1 | r_m2 | r_m3 | r_m4 | r_m5 | r_m6 | ... |

FIG. 4

AUTONOMOUS DRIVING APPARATUS FOR GENERATING A DRIVING PATH FOR AN INTERSECTION BASED ON A DRIVING RECORD, AND AN AUTONOMOUS DRIVING METHOD THEREOF

CROSS-REFERENCE TO RELATED APPLICATION

This application claims the benefit of priority to Korean Patent Application No. 10-2021-0090476, filed in the Korean Intellectual Property Office on Jul. 9, 2021, the entire contents of which are incorporated herein by reference.

TECHNICAL FIELD

Embodiments of the present disclosure relate to an autonomous driving apparatus and method for generating an intersection path reflecting driving records (i.e., previous driving information).

BACKGROUND

In general, an autonomous vehicle that performs autonomous driving based on an autonomous driving system of level 4 (according to classification criteria of the Society of Automotive Engineers International, SAE International) performs autonomous driving based on a global path and/or a local path generated based on an autonomous driving system. However, when autonomous driving is performed by always generating a local path based on a global path in case of driving at an intersection, paths are generated in the same or similar way for all intersections, causing a problem that the characteristics of intersections are not properly reflected.

In addition, it is common for an autonomous vehicle to learn a driving path and then perform autonomous driving based on the learned driving path for the same road. However, when autonomous driving is performed based on learning without considering the characteristics of the driving path, there is a problem in that efficient autonomous driving cannot be performed.

SUMMARY

The present disclosure has been made to solve the above-mentioned problems occurring in the prior art while advantages achieved by the prior art are maintained intact.

An aspect of the present disclosure provides an autonomous driving apparatus and method for comparing the path generated based on the autonomous driving system and the driver's actual driving path, and for selectively learning the driver's actual driving path when a vehicle is autonomously driving at an intersection.

Another aspect of the present disclosure provides an autonomous driving apparatus and method for performing autonomous driving at the same intersection at a later time (e.g., in the future) based on a selectively learned driving path of a driver when a vehicle is autonomously driving at an intersection.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an autonomous driving apparatus is provided for generating an intersection path reflecting a driving record. The autonomous driving apparatus may include: a path generating device that generates information on a first path for driving of an autonomous vehicle at an intersection; a path comparison operating device that generates offset information between the generated information on the first path and information on a second path along which the autonomous vehicle is driving; a comparison operation evaluating device that determines whether to store information on the second path based on the generated offset information; and a comparison operation storage that stores the information on the second path and the offset information based on the determination of whether to store the information on the second path.

Further, according to an embodiment, the offset information may include distance offset information and attribute offset information. The distance offset information may indicate distance information between a first point located on the first path and a second point located on the second path. The attribute offset information may indicate a difference between attribute information corresponding to the first point and attribute information corresponding to the second point.

Further, according to an embodiment, the attribute information may include at least one of heading angle information, steering angle information, and/or lateral acceleration information of the vehicle, and/or curvature information at a point located on a path.

Further, according to an embodiment, the second point located on the second path may be located on a straight line connecting the first point which is located on the first path and a center point. Also, the center point may indicate a central point of a circle having a smallest curvature among one or more circles connecting an entry location and an exit location for the intersection.

Further, according to an embodiment, the comparison operation evaluating device may determine to store the information on the second path in response to the distance offset information and the attribute offset information being smaller than a preset threshold. The comparison operation evaluating device may also determine not to store the information on the second path in response to the distance offset information or the attribute offset information being greater than the preset threshold.

Further, according to an embodiment, the comparison operation storage may store the information on the second path and the offset information in response to the distance offset information and the attribute offset information being smaller than a preset threshold, and the information on the second path may include attribute information corresponding to the second point.

Further, according to an embodiment, the comparison operation storage may store identification information on the intersection in response to the distance offset information and the attribute offset information being smaller than the preset threshold.

Further, according to an embodiment, the path generating device may generate information on the first path based on one of a global path for the autonomous vehicle or a lane link path for the intersection.

Further, according to an embodiment, the global path may be generated based on source location information, destination location information, and/or current location information of the vehicle. The source location information, the destination location information, and the current location information may be expressed based on GPS (Global Positioning System). The lane link path may correspond to a path corresponding to a circle having the smallest curvature among one or more circles connecting the entry location and the exit location of the intersection.

Further, according to an embodiment, the information on the first path may be generated further based on at least one of a speed of the vehicle, an acceleration of the vehicle, or a distance between an object located on the intersection and the vehicle, in response to the information on the first path being generated based on the global path.

Further, according to an aspect of the present disclosure, an autonomous driving method is provided for generating an intersection path reflecting a driving record. The autonomous driving method includes: generating information on a first path for driving of an autonomous vehicle at an intersection; generating offset information between the generated information on the first path and information on a second path along which the autonomous vehicle is driving; determining whether to store information on the second path based on the generated offset information; and storing the information on the second path and the offset information based on the determination of whether to store the information on the second path.

Further, according to an embodiment, the offset information may include distance offset information and attribute offset information. The distance offset information may indicate distance information between a first point located on the first path and a second point located on the second path. The attribute offset information may indicate a difference between attribute information corresponding to the first point and attribute information corresponding to the second point.

Further, according to an embodiment, the attribute information may include at least one of heading angle information, steering angle information, and/or lateral acceleration information of the vehicle, and/or curvature information at a point located on a path.

Further, according to an embodiment, the second point located on the second path may be located on a straight line connecting the first point which may be located on the first path and a center point. The center point may indicate a central point of a circle having a smallest curvature among one or more circles connecting an entry location and an exit location for the intersection.

Further, according to an embodiment, the determining of whether to store information on the second path based on the generated offset information may include determining to store the information on the second path in response to the distance offset information and the attribute offset information being smaller than a preset threshold, and may include determining not to store the information on the second path in response to the distance offset information or the attribute offset information being greater than the preset threshold.

Further, according to an embodiment, the determining of whether to store information on the second path based on the generated offset information may further include storing the information on the second path and the offset information in response to the distance offset information and the attribute offset information being smaller than a preset threshold. The information on the second path may include attribute information corresponding to the second point.

Further, according to an embodiment, the determining of whether to store information on the second path based on the generated offset information may further include storing identification information on the intersection in response to the distance offset information and the attribute offset information being smaller than the preset threshold.

Further, according to an embodiment, the generating of the information on a first path for driving of an autonomous vehicle at an intersection may include generating information on the first path based on one of a global path for the autonomous vehicle or a lane link path for the intersection.

Further, according to an embodiment, the global path may be generated based on source location information, destination location information, and/or current location information of the vehicle. The source location information, the destination location information, and the current location information may be expressed based on GPS (Global Positioning System). The lane link path may correspond to a path corresponding to a circle having the smallest curvature among one or more circles connecting the entry location and the exit location of the intersection.

Further, according to an embodiment, the information on the first path may be generated further based on at least one of a speed of the vehicle, an acceleration of the vehicle, or a distance between an object located on the intersection and the vehicle, in response to the information on the first path being generated based on the global path.

BRIEF DESCRIPTION OF THE DRAWINGS

The above and other objects, features and advantages of the present disclosure should be more apparent from the following detailed description taken in conjunction with the accompanying drawings:

FIG. 4 illustrates examples of distance offset information and attribute offset information according to embodiments;

DETAILED DESCRIPTION

Figure 1:
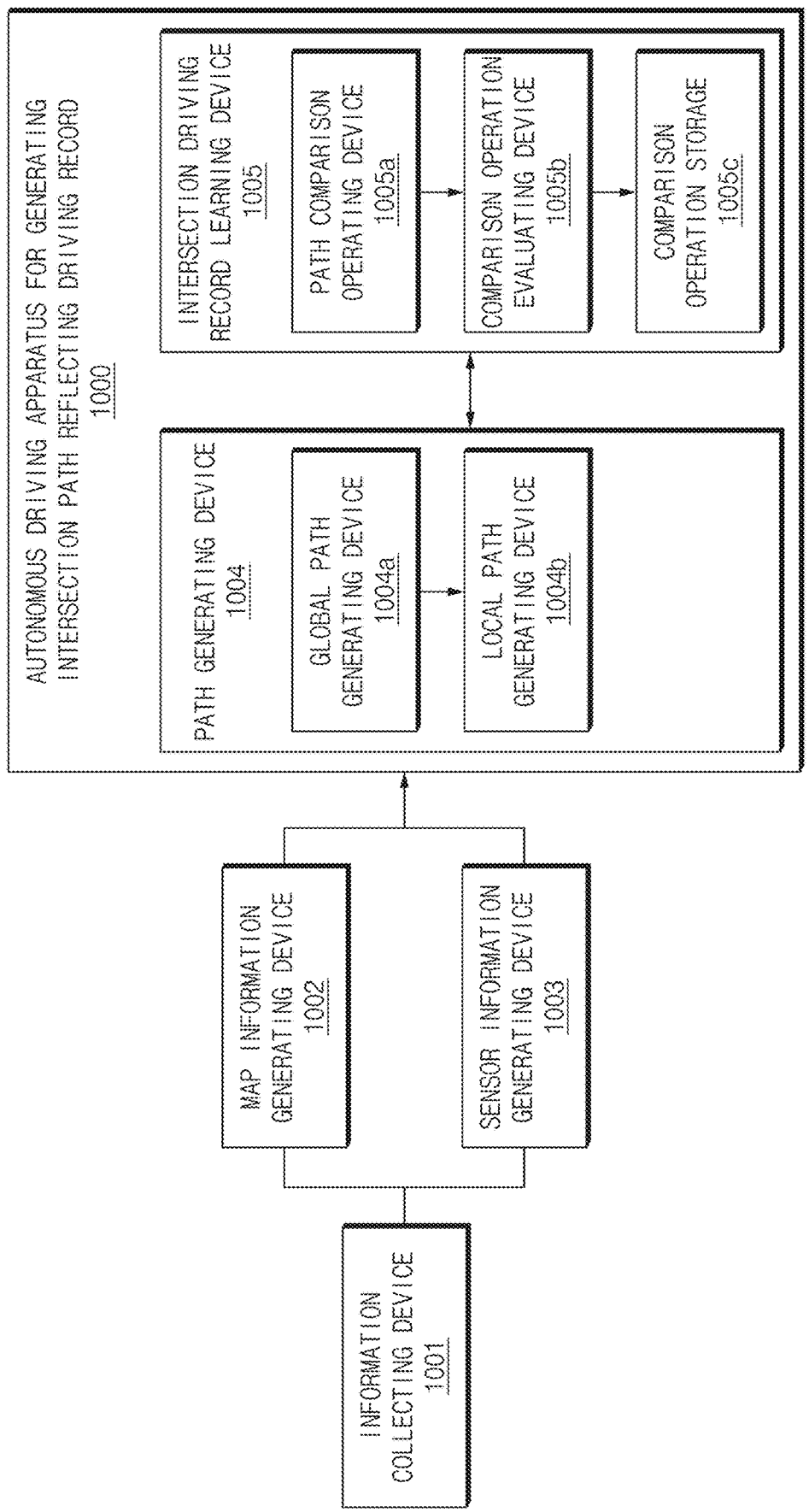
FIG. 1 illustrates an example of an autonomous driving apparatus for generating an intersection path reflecting driving records according to embodiments.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component. The terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or perform that operation or function.

Embodiments of the present disclosure are described below in detail with reference to FIGS. 1-6.

FIG. 1 illustrates an example of an autonomous driving apparatus for generating an intersection path reflecting driving records according to embodiments.

The drawing shows an example of one or more elements included in an autonomous driving apparatus for generating an intersection path reflecting driving records according to one or more embodiments. An autonomous driving apparatus 1000 according to one or more embodiments may include a path generating device 1004 and/or an intersection driving record learning device 1005. Although an information collecting device 1001, a map information generating device 1002, and a sensor information generating device 1003 are shown in FIG. 1 as being outside the autonomous driving apparatus according to the embodiments, they may be included in the autonomous driving apparatus. The autonomous driving apparatus according to the embodiments may further include one or more elements not shown in this drawing.

The autonomous driving apparatus according to embodiments may be an apparatus for autonomous driving of an autonomous vehicle. In other words, the autonomous vehicle may be controlled by the autonomous driving apparatus described with reference to this drawing. The autonomous driving apparatus according to the embodiments may be located outside or inside the autonomous vehicle.

The information collecting device 1001 according to the embodiments may provide information on the autonomous vehicle and/or information on an environment around the autonomous vehicle to the map information generating device and/or to the sensor information generating device based on a camera, radar, and/or LiDAR. For example, the information collecting device 1001 may provide the map information generating device 1002 with information on a current location, own speed, and acceleration of the autonomous vehicle. In addition, the information collecting device 1001 may recognize an object located around the autonomous vehicle and provide distance between the vehicle and the recognized object and relative speed information to the sensor information generating device 1003. The information collecting device 1001 according to embodiments may be located outside or inside the autonomous vehicle.

The map information generating device 1002 according to the embodiments may receive information on the autonomous vehicle and/or information on the object from the information collecting device 1001 and generate map information for autonomous driving. For example, the map information generating device 1002 may figure out a current location and heading orientation of the autonomous vehicle based on the provided current location information and own speed information of the autonomous vehicle and may generate map information corresponding to the current location. The generated map information may include curvature information of a road and/or location information of a line corresponding to the current location of the autonomous vehicle. The map information generating 1002 device according to embodiments may transmit the generated map information to the autonomous driving apparatus that generates an intersection path reflecting a driving record.

The sensor information generating device 1003 according to one or more embodiments may receive the information on the autonomous vehicle and/or the information on the object from the information collecting device 1001 and may generate sensor information on an external environment corresponding to the current location of the autonomous vehicle. For example, the sensor information generating device 1003 may transmit information on an object located around the autonomous vehicle to the path generating device based on the recognized distance and relative speed information between the object and the autonomous vehicle. The generated sensor information on the external environment may include location information of the object around the vehicle, object type information, and/or object speed information. The sensor information generating device 1003 according to one or more embodiments may transfer the generated sensor information to the autonomous driving apparatus that generates an intersection path reflecting a driving record.

As described above, the autonomous driving apparatus for generating an intersection path reflecting the driving record may include a path generating device and/or an intersection driving record learning device.

The path generating device 1004 according to one or more embodiments may generate a path for autonomous driving. Specifically, the path generating device 1004 may generate a path for autonomous driving based on the map information received from the map information generating device 1002 and the sensor information on the external environment received from the sensor information generating device 1003.

The path generating device 1004 according to one or more embodiments may include a global path generating device 1004a and/or a local path generating device 1004b. The path generating device 1004 according to one or more embodiments may further include one or more elements for generating a path for autonomous driving, which is not shown in this drawing.

The global path generating device 1004a according to one or more embodiments may generate a global path for autonomous driving of the autonomous vehicle.

The autonomous vehicle according to the embodiments may refer to a vehicle capable of driving autonomously (autonomous driving) from a source location to a destination location without a driver's operation. The above-described autonomous vehicle may drive along a path generated based on a source location, a destination location, and/or a stop-over location expressed based on a global positioning system (GPS). Here, the generated path may be referred to as a global path. In other words, the global path according to one or more embodiments may be generated based on source location information, destination location information, and/or current location information of the autonomous vehicle. The above-described source location information, the destination location information, and the current location information of the autonomous vehicle may be expressed based on global positioning system (GPS). A method for generating a global path according to one or more embodiments is not limited to the above-described example.

The local path generating device 1004b according to one or more embodiments may generate a local path for autonomous driving of the autonomous vehicle.

The local path generating device 1004b according to the embodiments may generate a local path based on the generated global path. In other words, the local path according to the embodiments may indicate a detailed path generated based on the global path.

Various variables may be caused between a time when the global path generating device 1004a according to the embodiments generates a global path and a time when the autonomous vehicle drives based on the generated global path. For example, an object (another vehicle) that has not been on the global path when the global path is generated may be located on the global path when the autonomous vehicle drives autonomously. Accordingly, the local path generating device 1004b according to one or more embodiments may generate a local path based on the generated global path so as to correspond to the various variables described above. For example, the local path generating device may generate a local path for avoiding other vehicles located on the global path at the time of autonomous driving. Accordingly, the autonomous vehicle according to the embodiments may autonomously drive based on the generated global path and/or local path.

The local path according to embodiments may be variously called a local path and/or a first path.

The autonomous vehicle according to the embodiments may perform autonomous driving based on an autonomous driving system. The autonomous driving system may be classified into six levels (level 0 to level 5 categorized by the Society of Automotive Engineers (SAE) International) based on the degree to which the system controls the autonomous vehicle and the degree to which the driver of the autonomous vehicle intervenes in driving.

Level 0 may indicate no driving automation, Level 1 may indicate driver assistance, Level 2 may indicate partial driving automation, Level 3 may indicate conditional driving automation, Level 4 may indicate high driving automation, and Level 5 may indicate full driving automation. The definition for level 0 to level 5 is the same as or similar to that defined by the above-mentioned Society of Automotive Engineers (SAE) International.

The autonomous vehicle according to the embodiments may perform autonomous driving based on an autonomous driving system of level 4 described above. In other words, the autonomous vehicle according to the embodiments may autonomously drive the entire path from the source location to the destination location based on the autonomous driving system. As described above, the autonomous vehicle may perform autonomous driving based on the generated global path and/or local path. For example, the autonomous vehicle may perform autonomous driving based on a virtual path indicated by a global path even at an intersection.

However, as described above, when the autonomous vehicle always generates a local path based on a global path and then performs autonomous driving in the case of driving at an intersection, the path may be generated in the same or similar manner for all intersections. In this case, there may be a problem that the autonomous vehicle cannot perform autonomous driving reflecting characteristics of the intersection.

To overcome the above-described problem, the autonomous vehicle according to one or more embodiments may generate a path reflecting a driving record associated with a driver when the autonomous vehicle enters an intersection. In other words, the autonomous vehicle according to the embodiments may learn a driver's intersection driving path when autonomously driving at an intersection and may perform autonomous driving based on the learned path when autonomously driving the same intersection at a later time. In addition, the autonomous vehicle according to the embodiments may individually compare the local path generated based on the global path with the driver's driving path to determine priorities of the two paths and may learn the driver's driving path only when the driver's driving path has a high priority. Thus, autonomous driving may be performed more efficiently.

The autonomous vehicle according to the embodiments may include an intersection driving record learning device to perform the above-described operation.

The intersection driving record learning device 1005 according to one or more embodiments may compare a local path with the driver's actual driving path and selectively store (or learn) the driver's driving path when the autonomous vehicle drives at an intersection. The intersection driving record learning device according to one or more embodiments may include a path comparison operating device 1005a, a comparison operation evaluating device 1005b, and/or a comparison operation storage 1005c. The intersection driving record learning device 1005 according to one or more embodiments may further include one or more elements not shown in this drawing.

The path-path comparison operating device 1005a according to one or more embodiments may generate offset information between a local path and a driving path of the autonomous vehicle which is driving at an intersection. The driving path of the driver according to the embodiments may be variously called a driving path, a second path, information on the second path, or the like.

The local path generated by the local path generating device 1004b according to the embodiments may include not only location information of the path indicating the local path, but also attribute information of the autonomous vehicle on the path (e.g., vehicle heading angle information, steering angle information, lateral acceleration information, path curvature information, or the like). Accordingly, the local path according to the embodiments may be variously called a first path, information on the local path, information on the first path, or the like.

The offset information generated by the path comparison operating device 1005a according to one or more embodiments may include distance offset information and attribute offset information. The distance offset information may indicate a difference in distance between the local path and the driving path. The attribute offset information may indicate a difference in attribute information between the local path and the driving path.

The comparison operation evaluating device 1005b according to one or more embodiments may determine whether to store the driving path based on the generated offset information.

The comparison operation storage 1005c according to one or more embodiments may store the driving path and offset information based on the determination of whether to store the driving path.

In other words, the autonomous vehicle according to the embodiments may perform efficient autonomous driving with efficient data processing by comparing the generated local path with the driver's actual driving path and by selectively learning the driver's actual driving path through the apparatus described with reference to this drawing when autonomously driving at an intersection. In addition, the autonomous vehicle according to the embodiments may perform autonomous driving reflecting the characteristics of each intersection by performing autonomous driving with respect to the same intersection in the future based on the driving path selectively learned through the apparatus described with reference to this drawing.

Figure 2:
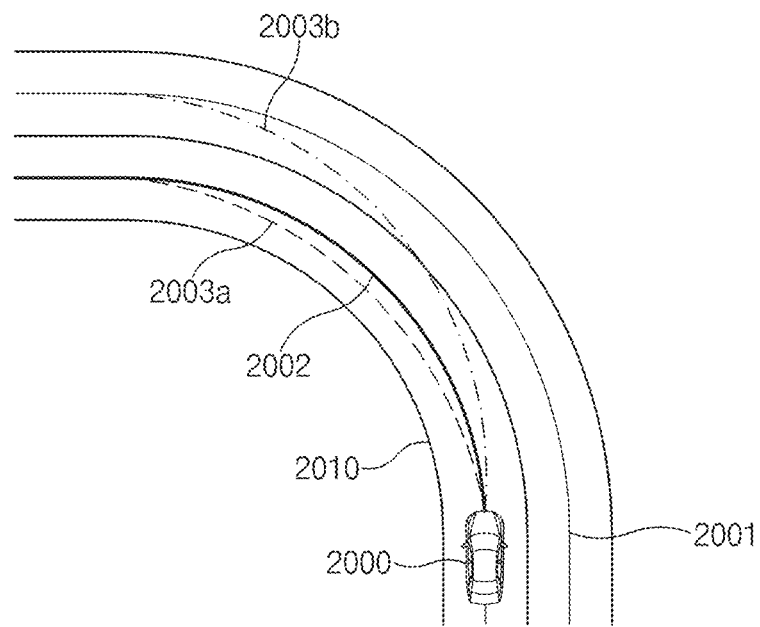
FIG. 2 illustrates examples of a global path, a local path, and a driving path according to embodiments.

FIG. 2 illustrates examples of a global path, a local path, and a driving path according to one or more embodiments.

FIG. 2 is a drawing for describing a global path and a local path generated by an autonomous driving apparatus that generates an intersection path reflecting driving records according to embodiments (e.g., the autonomous driving apparatus described with reference to FIG. 1) and an actual driving path along which a vehicle driver practically drives. The descriptions for the global path, the local path, and the driving path according to the embodiments are the same as or similar to those described above with reference to FIG. 1.

As described above with reference to FIG. 1, the autonomous driving apparatus (e.g., the path generating device 1004) according to one or more embodiments may generate a local path based on a global path. Reference numeral "2000" indicates an autonomous vehicle according to embodiments. Reference numeral "2001" indicates a global path according to embodiments. Reference numeral "2002" indicates a local path according to embodiments. Reference numeral "2010" indicates an intersection (e.g., the intersection described with reference to FIG. 1) according to embodiments. As shown in FIG. 2, the local path may be generated on the global path.

The autonomous driving apparatus according to one or more embodiments may perform intersection autonomous driving based on the generated local path. It should be noted that the autonomous vehicle according to embodiments may drive according to the driver's actual driving path, not the generated local path when driving at an intersection, as described above with reference to FIG. 1. Reference numerals "2003a" and "2003b" represent a driver's actual driving paths. For example, reference numeral "2003a" indicates a driving path of the driver when there is no lane change while driving at an intersection. Further, reference numeral "2003b" indicates a driving path of the driver when there is a lane change while driving at an intersection.

As described above with reference to FIG. 1, the autonomous driving apparatus according to the embodiments may compare the generated local path with the driver's actual driving path and may determine whether to learn the driver's actual driving path. The autonomous driving apparatus according to the embodiments may determine whether to store (learn) the driver's actual driving path described above based on offset information (offset information described with reference to FIG. 1) between the local path (the first path or information on the first path) and the driving path (the second path or information on the second path).

In other words, the autonomous vehicle may perform autonomous driving with efficient data processing by comparing the generated local path with the driver's actual driving path and by selectively learning the driver's actual driving path through the apparatus according to the embodiments when autonomously driving at an intersection. In addition, the autonomous vehicle may perform autonomous driving reflecting the characteristics of each intersection by performing autonomous driving with respect to the same intersection in the future based on the driving path selectively learned through the apparatus according to the embodiments.

Figure 3:
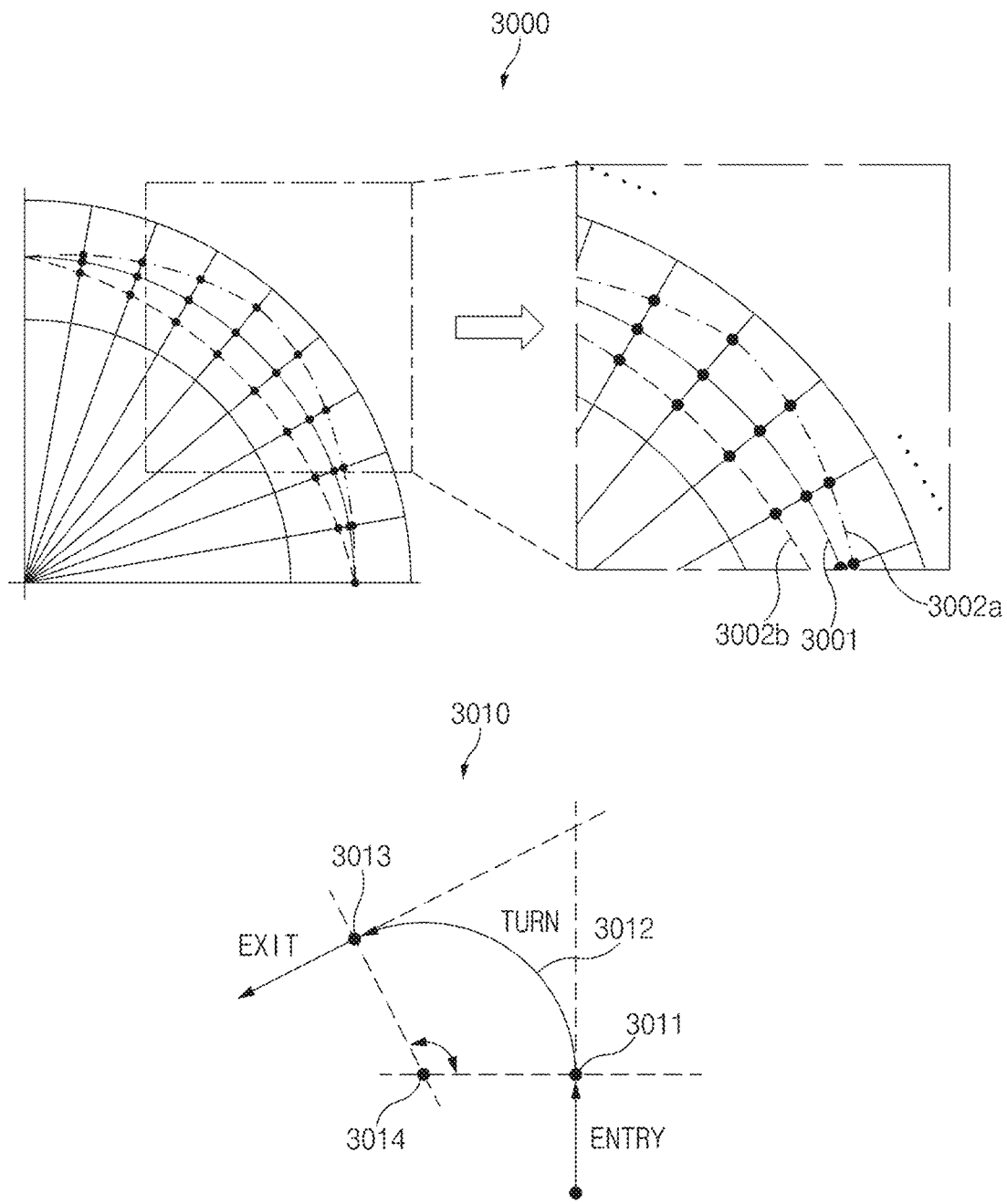
FIG. 3 is a diagram for describing offset information according to embodiments.

FIG. 3 is a diagram for describing offset information according to embodiments.

This drawing is a diagram for describing the offset information described with reference to FIGS. 1 and 2. As described above with reference to FIG. 1, the offset information according to one or more embodiments may include distance offset information and/or attribute offset information. The distance offset information and/or attribute offset information according to one or more embodiments may be generated for each specific point on a path (e.g., a local path (first path), a driving path (second path), or the like described with reference to FIGS. 1 and 2). The specific point on the path may be generated based on a center point of the path.

Reference numeral "3000" is a diagram for describing a specific point on the path as described above. Reference numeral "3010" is a diagram for describing a center point for defining the specific point on the path as described above.

Reference numeral "3001" indicates a local path generated on an intersection. Reference numerals "3002a" and "3002b" represent actual driving paths of an autonomous vehicle driving on the intersection. For example, reference numerals "3002a" and "3002b" represent a driving path of the driver when there is no lane change while driving at the intersection described above with reference to FIG. 2 and a driving path of the driver when there is a lane change while driving at the intersection.

Reference numeral "3010" is a diagram for describing a center point according to embodiments.

Reference numeral "3011" indicates an entry location of an intersection according to embodiments. Reference numeral "3012" indicates a turn path generated along the intersection. The turn path may coincide with the local path and/or the global path described above. Reference numeral "3013" indicates an exit location of an intersection according to embodiments.

The autonomous driving apparatus (e.g., the path generating device 1004) according to one or more embodiments may recognize a central point of a circle having the smallest curvature among one or more circles connecting the entry location and the exit location. The autonomous driving apparatus according to the embodiments may recognize a center point (or a central point) of the recognized circle as the above-described center point. For example, there may be two circles connecting the entry location and exit location. The autonomous driving apparatus may recognize the central point of a circle having the smaller curvature (or radius) among the two circles and may recognize it as the center point. Reference numeral "3014" of reference numeral "3010" indicates a center point according to embodiments.

A virtual path on the intersection drawn based on the above-described center point may be referred to as a lane link. In other words, the lane link may be a part of a circle having the above-described center point as a central point. A first path for driving at an intersection according to one or more embodiments may be generated based on the global path as described above as well as based on the lane link. For example, when data on the global path is not sufficient to generate a local path, the path generating device according to embodiments may generate the first path (local path) based on the lane link.

As described above, offset information according to one or more embodiments may be generated for each specific point on a path. A first point (or a plurality of first points) may be located on a first path (local path) according to one or more embodiments. A second point (or a plurality of second points) may be located on a second path (driving path) according to one or more embodiments. The first point and/or the second point may be generated at equal or different intervals on the first path and/or the second path. The above-described center point, the first point, and the second point may be located on the same straight line. In other words, the second point located on the second path may be located on a straight line connecting the first point located on the first path and the center point.

The distance offset information according to one or more embodiments may indicate distance information between the first point located on the first path and the second point located on the second path. In other words, the distance offset information may indicate a separation distance between the first point and the second point located on the same straight line. Accordingly, when there are a plurality of first points and a plurality of second points, the distance offset information may include a plurality of pieces of distance information.

The attribute offset information according to one or more embodiments may indicate a difference between attribute information corresponding to the first point located on the first path and attribute information corresponding to the second point located on the second path.

The attribute information according to one or more embodiments may be information indicating an attribute related to driving of the autonomous vehicle. For example, the attribute information may indicate heading angle information, steering angle information, or lateral acceleration information of a vehicle, curvature information at a point located on a path (e.g., the first point or the second point), or the like. The attribute information may include at least one or more of the above-described pieces of information.

Because the attribute information corresponding to the first point according to one or more embodiments indicates attribute information corresponding to a specific point on a local path, the attribute information may be generated by the path generating device (the path generating device 1004 of FIG. 1). Because the attribute information corresponding to the second point according to one or more embodiments indicates attribute information corresponding to a specific point on a driving path, the attribute information may be generated by the sensor information generating device (the sensor information generating device 1003 of FIG. 1) during driving at the intersection.

The autonomous driving apparatus according to the embodiments may generate offset information and selectively learn the driver's actual driving path at the intersection based on the offset information to control the autonomous driving vehicle with efficient data processing, according to the method described with reference to FIG. 3.

FIG. 4 illustrates examples of distance offset information and attribute offset information according to embodiments;

The drawing shows examples of distance offset information and/or attribute offset information included in the offset information described above with reference to FIG. 3. Reference numeral "4000" may be a table for describing examples of the distance offset information and/or the attribute offset information. As described above with reference to FIG. 3, the distance offset information and/or the attribute offset information according to one or more embodiments may be generated for each specific point on a path (e.g., a first point, a second point, or the like).

As described above with reference to FIGS. 1-3, a local path (the first path) may be generated based on a global path. Reference numeral "4001" may be a row indicating specific points (points) located on the global path. Reference numeral "4002" may be a row indicating first points on a first path (local path) and attribute information corresponding to the first points. Reference numeral "4003" may be a row indicating second points on a second path (driving path) and attribute information corresponding to the second points.

The map information in the first column of the row indicated by reference numeral "4001" may indicate the map information described above with reference to FIG. 1. A specific point may be located on the global path. For example, P1 and P2 may be located on the global path.

Information on the first path in the first column of the row indicated by reference numeral "4002" may indicate information on the first path (or the first path) described above with reference to FIGS. 1 and 2. As described above with reference to FIG. 3, the first point(s) may be located on the first path. As described above with reference to FIG. 1, the first points may be generated based on specific points on the global path because the local path is generated based on the global path. For example, points p1-p6 may be located on the first path, and p1 of the points may indicate P1 on the global path and p5 of the points may indicate P2 on the global path.

As described above with reference to FIG. 3, attribute information may be generated for each first point. For example, the attribute information corresponding to p1 may have h1 as heading angle information, s1 as steering angle information, ay1 as lateral acceleration information, and/or r1 as curvature information. The attribute information included in the information on the first path according to one or more embodiments may be generated for each of the first point p1 to the first point p6.

Information on the first path in the first column of the row indicated by reference numeral "4003" may indicate information on the second path (or the second path) described above with reference to FIGS. 1 and 2. As described above with reference to FIG. 3, second point(s) may be located on the second path. The number of second points and the number of first points according to embodiments may be equal to each other. As described above with reference to FIG. 3, the distance offset information may indicate a separation distance between a first point and a second point existing on the same straight line. In reference numeral "4003", m1-m6 may indicate distance offset information (separation distance) according to the first points and the second points, respectively.

As described above with reference to FIG. 3, the attribute offset information may indicate a difference between attribute information corresponding to the first point and attribute information corresponding to the second point. In reference numeral "4003", h_m1-h_m6 may indicate differences between heading angle information corresponding to the first points and heading angle information corresponding to the second points, respectively. In reference numeral "4003", s_m1-s_m6 may represent differences between steering angle information corresponding to the first points and steering angle information corresponding to the second points, respectively. In reference numeral "4003", ay_m1-ay_m6 may indicate differences between lateral acceleration information corresponding to the first points and lateral acceleration information corresponding to the second points, respectively. In reference numeral "4003", r_m1-r_m6 of 4003 may indicate differences between curvature information corresponding to the first points and curvature information corresponding to the second points, respectively.

The autonomous driving apparatus according to the embodiments may provide autonomous driving with efficient data processing by determining whether to learn a driving path of the driver at the intersection based on the offset information described with reference to this drawing.

Figure 5:
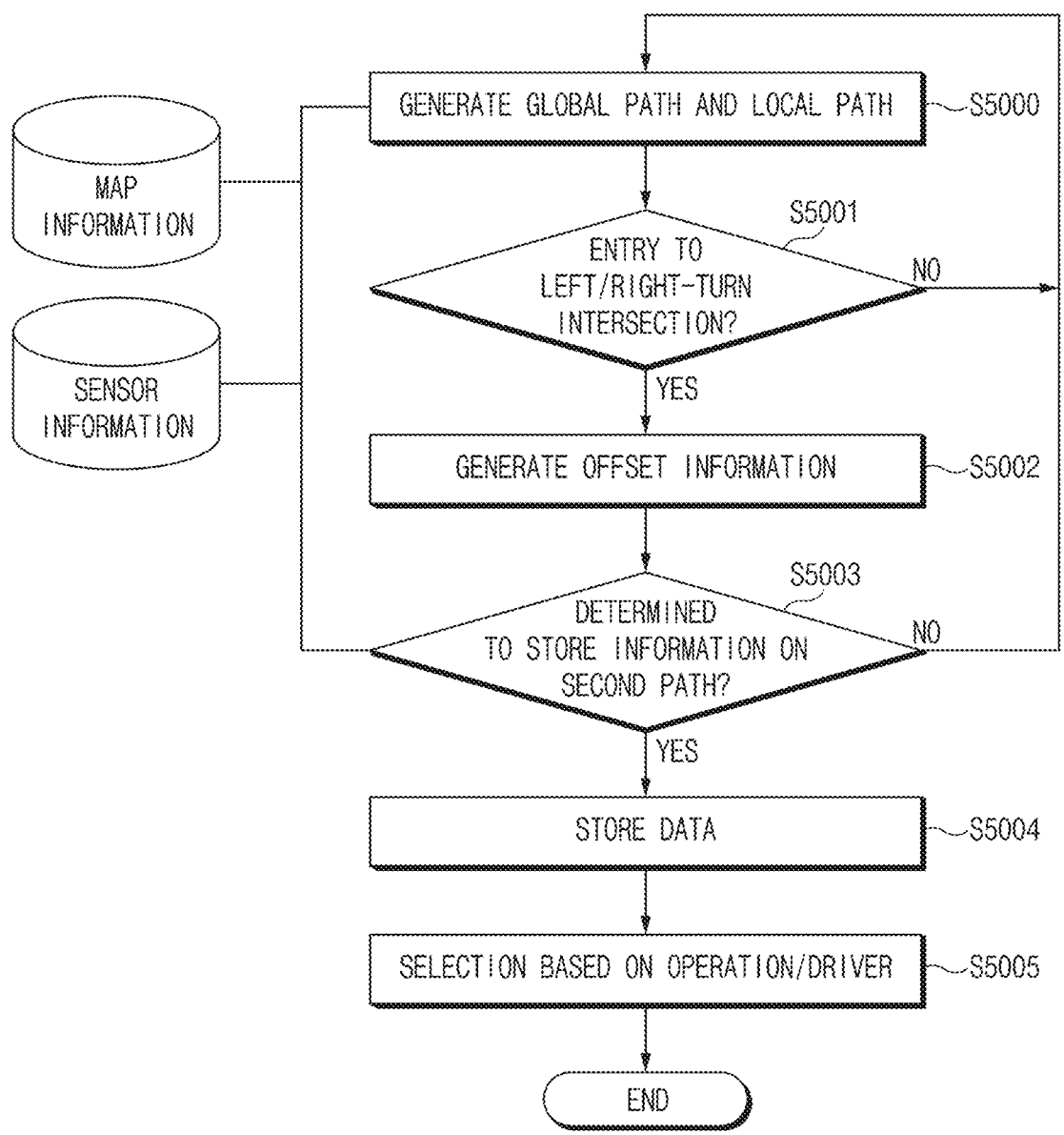
FIG. 5 is a flowchart of an autonomous driving method for generating an intersection path reflecting driving records according to embodiments.

FIG. 5 is a flowchart of an autonomous driving method for generating an intersection path reflecting driving records according to one or more embodiments.

FIG. 5 is a flowchart showing an example of an autonomous driving method for generating an intersection path reflecting driving records according to one or more embodiments. An autonomous driving apparatus (e.g., the autonomous driving apparatus described with reference to FIGS. 1-4) for generating an intersection path reflecting the driving records according to the embodiments may perform the autonomous driving method shown in the flowchart of this drawing. The autonomous driving method for generating an intersection path reflecting driving records according to the embodiments may further include one or more operations not shown in FIG. 5.

The global and local path generating operation S5000 may represent a process of generating a global path and/or a local path (or a first path) based on map information and/or sensor information. The path generating device (e.g., the path generating device 1004 of FIG. 1) according to one or more embodiments may perform S5000. Descriptions for the map information and the sensor information according to one or more embodiments are the same as or similar to those described above with reference to FIG. 1. Descriptions for the global path and/or the local path according to one or more embodiments is the same as or similar to those described above with reference to FIGS. 1-5.

In response to the autonomous vehicle according to the embodiments entering the left-turn or right-turn intersection (S5001), a path comparison operating device (the path comparison operating device 1005*a* of FIG. 1) of the autonomous driving apparatus according to the embodiments may perform operation of generating offset information (S5002). S5001 may represent operation of generating offset information between information on the first path and information on the second path. A description for the offset information according to the embodiments may be the same as or similar to that described above with reference to FIGS. 1-5.

S5003 may represent operation of determining whether to store information on the second path according to embodiments. The comparison operation evaluating device 1005*b* of the autonomous driving apparatus according to the embodiments may perform S5003.

The comparison operation evaluating device according to one or more embodiments may perform S5003 based on distance offset information (the distance offset information described above with reference to FIGS. 1 and 3-5). The comparison operation evaluating device according to one or more embodiments may determine to store the information on the second path in response to the distance offset information being smaller than a preset threshold. When the distance offset information and the attribute offset information are smaller than the preset threshold, the apparatus according to the embodiments may determine that the autonomous vehicle does not change a lane while driving at the intersection. Accordingly, in this case, the apparatus according to the embodiments may learn a driving path (second path) of the autonomous vehicle. The comparison operation evaluating device according to one or more embodiments may not store information on the second path in response to the distance offset information or the attribute offset information being greater than the preset threshold. When the distance offset information is greater than the preset threshold, the apparatus according to the embodiments may determine that the autonomous vehicle has changed a lane while driving at the intersection. Also, when the attribute offset information is greater than the preset threshold, the apparatus according to the embodiments may determine that the information on the second path is unusable information due to a sudden stop or sudden departure of the autonomous vehicle. The preset threshold according to one or more embodiments may have a value set by a user or may have a value calculated by the apparatus according to embodiments.

S5004 may represent a process of storing information on the second path and/or offset information according to one or more embodiments. The comparison operation storage (the comparison operation storage 1005*c* of FIG. 1) according to the embodiments may implement S5004 described above. The comparison operation storage according to one or more embodiments may store information on the second path and/or offset information based on determination of whether to store the information on the second path. In other words, the comparison operation storage may store the information on the second path and/or the offset information in response to the distance offset information and the attribute offset information being smaller than a preset threshold. As described above, the information on the second path may include attribute information corresponding to the second point. Further, the comparison operation storage according to one or more embodiments may further store identification information on the intersection in response to the distance offset information and the attribute offset information being smaller than a preset threshold.

S5005 may indicate a process of determining whether to autonomously drive along the first path (operation-based path or local path) or the second path (the learned actual driving path) when the autonomous driving apparatus according to the embodiments re-enters the intersection for which the driving path has been learned. In other words, the apparatus according to the embodiments may determine whether to drive along a local path generated or a learned (stored) driving path based on the stored identification information on the intersection when re-entering the same intersection.

In other words, the autonomous vehicle may perform data processing and efficient autonomous driving by comparing the generated local path with the driver's actual driving path and by selectively learning the driver's actual driving path through the method described with reference to FIG. 5 when autonomously driving at an intersection. In addition, the autonomous vehicle may perform autonomous driving reflecting the characteristics of each intersection by performing autonomous driving with respect to the same intersection in the future based on the driving path selectively learned through the method described with reference to FIG. 5

Figure 6:
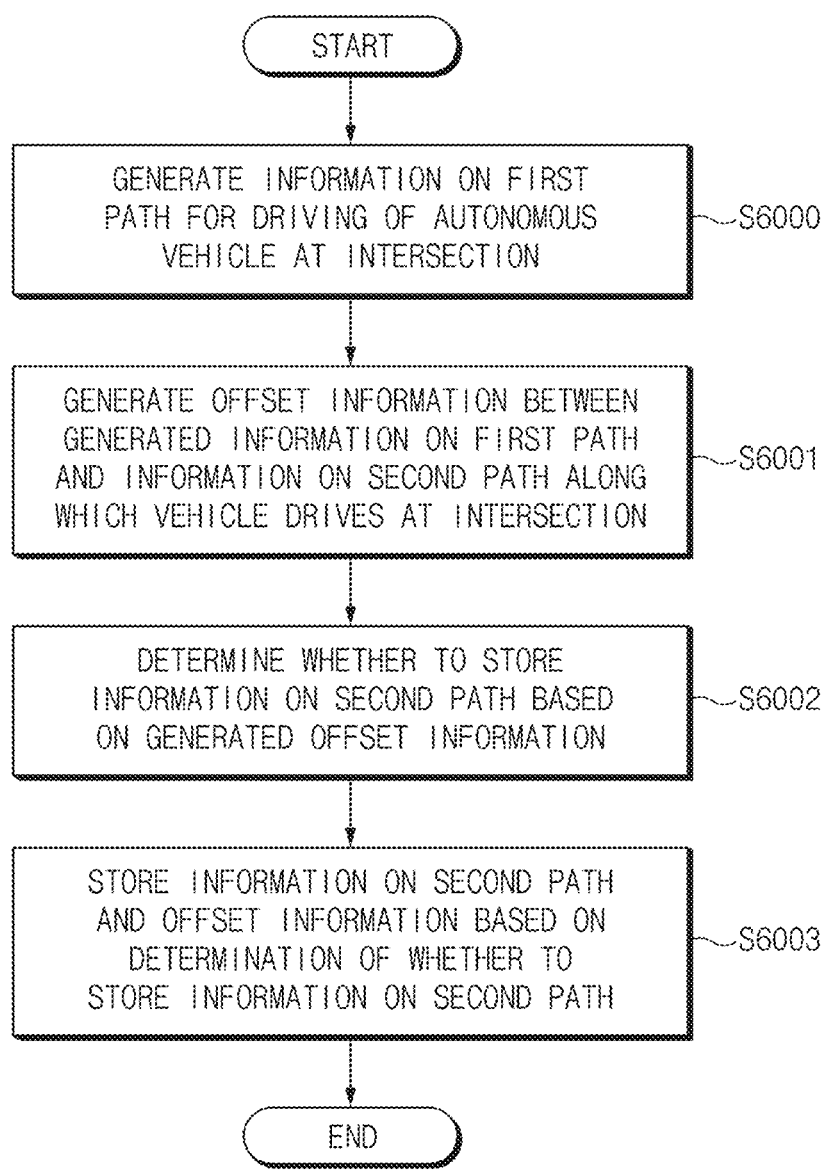
FIG. 6 is a flowchart of an autonomous driving method for generating an intersection path reflecting driving records according to embodiments.

FIG. 6 is a flowchart of an autonomous driving method for generating an intersection path reflecting driving records according to one or more embodiments.

The drawing shows an example of a flowchart of an autonomous driving method for generating an intersection path reflecting driving records according to one or more embodiments. The apparatus according to the embodiments (e.g., the apparatus described with reference to FIGS. 1-5) may perform an autonomous driving method described with reference to FIG. 6.

The autonomous driving method for generating an intersection path reflecting driving records according to one or more embodiments may include: generating information on a first path for driving of the autonomous vehicle at an intersection (S6000); generating offset information between the generated information on the first path and information on a second path along which the autonomous vehicle is driving (S6001); determining whether to store the information on the second path based on the generated offset information (S6002); and/or storing the information on the second path and offset information based on determination of whether to store the information on the second path (S6003). The autonomous driving method according to the embodiments may further include one or more operations not described in FIG. 6.

The offset information according to one or more embodiments may include distance offset information and attribute offset information. The distance offset information may represent distance information between the first point located on the first path and the second point located on the second path. The attribute offset information may represent a difference between attribute information corresponding to the first point and attribute information corresponding to the second point.

The attribute information according to one or more embodiments may include at least one of heading angle information, steering angle information and lateral acceleration information of the vehicle, and/or curvature information at a point located on a path.

The second point located on the second path according to one or more embodiments may be located on a straight line connecting the first point located on the first path and the center point. The center point may indicate a central point of a circle having the smallest curvature among one or more circles connecting an entry location and an exit location for the intersection.

Descriptions for the offset information, the first path, the first point, the second path, the second point, the center point, the distance offset information, the attribute offset information, and the attribute information may be the same as or similar to those described above with reference to FIGS. 3 and 4.

Operation S6002 according to one or more embodiments may include determining to store the information on the second path in response to the distance offset information and the attribute offset information being smaller than a preset threshold. Operation S6002 may also include determining not to store the information on the second path in response to the distance offset information or the attribute offset information being greater than the preset threshold. A detailed description for the operation of determining whether to store the information on the second path based on the preset threshold may be the same as or similar to that described above with reference to FIG. 5.

Operation S6002 according to one or more embodiments may further include storing the information on the second path and the offset information in response to the distance offset information and the attribute offset information being smaller than a preset threshold. The information on the second path according to one or more embodiments may include attribute information corresponding to the second point. A detailed description of the above-described operation may be the same as or similar to that described above with reference to FIG. 5.

Operation S6002 according to one or more embodiments may further include storing identification information on the intersection in response to the distance offset information and the attribute offset information being smaller than a preset threshold. A detailed description of the above-described operation may be the same as or similar to that described above with reference to FIG. 5.

Operation S6000 according to one or more embodiments may include generating information on the first path based on one of a global path for the autonomous vehicle or a lane link path for the intersection. The global path according to embodiments may be generated based on source location information, destination location information, and/or current location information of the vehicle. The source location information, the destination location information, and the current location information of the vehicle may be expressed based on GPS. A description for the global path according to one or more embodiments is the same as or similar to those described above with reference to FIGS. 1-5. The lane link path according to one or more embodiments may correspond to a path corresponding to a circle having the smallest curvature among one or more circles connecting the entry location and the exit location of the intersection. A description for the lane link according to the embodiments is the same as or similar to that described above with reference to FIGS. 1 and 2.

In response to the information on the first path according to one or more embodiments being generated based on the global path, the information on the first path may be generated further based on at least one of a vehicle speed, a vehicle acceleration, or a distance between an object located on an intersection and the vehicle. A description for the first path according to one or more embodiments may be the same as or similar to those described above with reference to FIGS. 1-5.

The above description is merely illustrative of the technical idea of the present disclosure. Various modifications and variations may be made without departing from the essential characteristics of the present disclosure by those having ordinary skill in the art to which the present disclosure pertains.

Therefore, the embodiments of the present disclosure are provided to explain the spirit and scope of the present disclosure, but not to limit them, so that the spirit and scope of the present disclosure is not limited by the embodiments. The scope of protection of the present disclosure should be interpreted by the following claims. All technical ideas within the scope equivalent thereto should be construed as being included in the scope of the present disclosure.

According to the embodiments, it is possible to provide a more efficient autonomous driving process in terms of data processing by comparing the path generated based on the autonomous driving system and the driver's actual driving path, and by selectively learning the driver's actual driving path when the vehicle is autonomously driving at an intersection.

Further, according to the embodiments, it is possible to provide an autonomous driving process reflecting characteristics of each intersection by performing autonomous driving on the same intersection later based on the selectively learned driving path of the driver.

In addition, various effects may be provided that are directly or indirectly understood through the disclosure.

Hereinabove, although the present disclosure has been described with reference to embodiments and the accompanying drawings, the present disclosure is not limited thereto. The present disclosure and the embodiments disclosed and described herein may be variously modified and altered by those having ordinary skill in the art to which the present disclosure pertains without departing from the spirit and scope of the present disclosure claimed in the following claims.

What is claimed is:

1. An autonomous driving apparatus for generating an intersection path reflecting a driving record, the autonomous driving apparatus comprising:
   a path generating device configured to generate information on a first path for driving of an autonomous vehicle at an intersection based on map information;
   a path comparison operating device configured to generate offset information between the generated information on the first path and information on a second path along which the autonomous vehicle is driving, wherein the second path is a driver's actual driving path;
a comparison operation evaluating device configured to determine whether to store the information on the second path based on the generated offset information; and
a comparison operation storage configured to store the information on the second path and the offset information based on the determination of whether to store the information on the second path,
wherein the comparison operation storage is configured to store the information on the second path and the offset information in response to the offset information being smaller than a preset threshold, and
wherein the autonomous driving apparatus is configured to learn the second path.

2. The autonomous driving apparatus of claim 1, wherein the offset information includes distance offset information and attribute offset information,
wherein the distance offset information indicates distance information between a first point located on the first path and a second point located on the second path, and
wherein the attribute offset information indicates a difference between attribute information corresponding to the first point and attribute information corresponding to the second point.

3. The autonomous driving apparatus of claim 2, wherein the attribute information includes at least one of heading angle information, steering angle information, and/or lateral acceleration information of the vehicle, and/or curvature information at a point located on a path.

4. The autonomous driving apparatus of claim 2, wherein the second point located on the second path is located on a straight line connecting the first point, which is located on the first path and a center point, and
wherein the center point indicates a central point of a circle having a smallest curvature among one or more circles connecting an entry location and an exit location for the intersection.

5. The autonomous driving apparatus of claim 2, wherein the comparison operation evaluating device is configured to:
determine to store the information on the second path in response to the distance offset information and the attribute offset information being smaller than a preset threshold, and
determine not to store the information on the second path in response to the distance offset information or the attribute offset information being greater than the preset threshold.

6. The autonomous driving apparatus of claim 2,
wherein the information on the second path includes the attribute information corresponding to the second point.

7. The autonomous driving apparatus of claim 6, wherein the comparison operation storage is configured to further store identification information on the intersection in response to the distance offset information and the attribute offset information being smaller than the preset threshold.

8. The autonomous driving apparatus of claim 1, wherein the path generating device is configured to generate the information on the first path based on one of a global path for the autonomous vehicle or a lane link path for the intersection.

9. The autonomous driving apparatus of claim 8, wherein the global path is generated based on source location information, destination location information, and/or current location information of the vehicle, and wherein the source location information, the destination location information, and the current location information are expressed based on GPS (Global Positioning System), and
wherein the lane link path corresponds to a path corresponding to a circle having the smallest curvature among one or more circles connecting an entry location and an exit location of the intersection.

10. The autonomous driving apparatus of claim 8, wherein the information on the first path is generated further based on at least one of a speed of the vehicle, an acceleration of the vehicle, or a distance between an object located on the intersection and the vehicle, in response to the information on the first path being generated based on the global path.

11. An autonomous driving method for generating an intersection path reflecting a driving record, the method comprising:
generating information on a first path for driving of an autonomous vehicle at an intersection based on map information;
generating offset information between the generated information on the first path and information on a second path along which the autonomous vehicle is driving, wherein the second path is a driver's actual driving path;
determining whether to store the information on the second path based on the generated offset information;
storing the information on the second path and the offset information based on the determination of whether to store the information on the second path; and
learning the second path,
wherein the determining of whether to store the information on the second path based on the generated offset information further includes storing the information on the second path and the offset information in response to the offset information being smaller than a preset threshold.

12. The method of claim 11, wherein the offset information includes distance offset information and attribute offset information,
wherein the distance offset information indicates distance information between a first point located on the first path and a second point located on the second path, and
wherein the attribute offset information indicates a difference between attribute information corresponding to the first point and attribute information corresponding to the second point.

13. The method of claim 12, wherein the attribute information includes at least one of heading angle information, steering angle information, and/or lateral acceleration information of the vehicle, and/or curvature information at a point located on a path.

14. The method of claim 12, wherein the second point located on the second path is located on a straight line connecting the first point, which is located on the first path and a center point, and
wherein the center point indicates a central point of a circle having a smallest curvature among one or more circles connecting an entry location and an exit location for the intersection.

15. The method of claim 12, wherein the determining of whether to store the information on the second path based on the generated offset information includes determining to store the information on the second path in response to the distance offset information and the attribute offset information being smaller than a preset threshold, and determining not to store the information on the second path in response to the distance offset information or the attribute offset information being greater than the preset threshold.

16. The method of claim 12, wherein the information on the second path includes the attribute information corresponding to the second point.

17. The method of claim 16, wherein the determining of whether to store the information on the second path based on the generated offset information further includes storing identification information on the intersection in response to the distance offset information and the attribute offset information being smaller than the preset threshold.

18. The method of claim 11, wherein the generating of the information on the first path for driving of the autonomous vehicle at the intersection includes generating information on the first path based on one of a global path for the autonomous vehicle or a lane link path for the intersection.

19. The method of claim 18, wherein the global path is generated based on source location information, destination location information, and/or current location information of the vehicle, and wherein the source location information, the destination location information, and the current location information are expressed based on GPS (Global Positioning System), and wherein the lane link path corresponds to a path corresponding to a circle having the smallest curvature among one or more circles connecting an entry location and an exit location of the intersection.

20. The method of claim 18, wherein the information on the first path is generated further based on at least one of a speed of the vehicle, an acceleration of the vehicle, or a distance between an object located on the intersection and the vehicle, in response to the information on the first path being generated based on the global path.

* * * * *